(12) United States Patent
Ohashi

(10) Patent No.: US 8,045,229 B2
(45) Date of Patent: Oct. 25, 2011

(54) IMAGE PROCESSING APPARATUS, IMAGE PROCESSING METHOD AND MEDIUM

(75) Inventor: Yoshinori Ohashi, Ichikawa (JP)

(73) Assignee: Canon Kabushiki Kaisha, Tokyo (JP)

(*) Notice: Subject to any disclaimer, the term of this patent is extended or adjusted under 35 U.S.C. 154(b) by 624 days.

(21) Appl. No.: 12/190,032

(22) Filed: Aug. 12, 2008

(65) Prior Publication Data

US 2009/0051978 A1    Feb. 26, 2009

(30) Foreign Application Priority Data

Aug. 21, 2007  (JP) ................ 2007-215246

(51) Int. Cl.
*G06K 15/00* (2006.01)
*G06K 9/34* (2006.01)
*G06K 9/00* (2006.01)
*G06K 9/40* (2006.01)
*G06K 9/36* (2006.01)

(52) U.S. Cl. ......... 358/2.1; 382/176; 382/178; 382/181; 382/190; 382/275; 382/290

(58) Field of Classification Search .......... 358/2.1; 382/176, 296, 289, 281, 178, 275, 290, 194, 382/199, 173, 190, 181
See application file for complete search history.

(56) References Cited

U.S. PATENT DOCUMENTS

| 5,452,374 A | * | 9/1995 | Cullen et al. ............ 382/293 |
| 7,016,552 B2 | * | 3/2006 | Koyama ................ 382/289 |
| 2008/0205758 A1 | * | 8/2008 | Zandifar et al. ........... 382/176 |

FOREIGN PATENT DOCUMENTS

| JP | 2000-285187 | 10/2000 |
| JP | 2000-285190 | 10/2000 |
| JP | 2001-109842 | 4/2001 |

* cited by examiner

*Primary Examiner* — Charlotte M Baker (74) *Attorney, Agent, or Firm* — Cowan, Liebowitz & Latman, P.C.

(57) ABSTRACT

An image processing apparatus comprises an extraction unit configured to extract areas having predetermined attributes from image data of a document; a calculation unit configured to calculate skew angles of the areas extracted by the extraction unit; a selection unit configured to select necessary elements by determining, as unnecessary elements, the areas having the calculated skew angles not less than a threshold and by determining, as the necessary element, the areas having the calculated skew angles less than the threshold; and a processing unit configured to apply image processing to the necessary elements selected by the selection unit.

8 Claims, 6 Drawing Sheets

|  | SKEW ANGLE |
|---|---|
| TABLE BLOCK 504 | 0.003 |
| TABLE BLOCK 507 | -0.025 |
| FRAME BLOCK 501 | -2.42 |
| FRAME BLOCK 506 | 0.01 |
| FRAME BLOCK 508 | 2.53 |

PROPOSAL

THIS IS SAMPLE IMAGE USED TO EXPLAIN THIS IDEA.
THIS IS SAMPLE IMAGE USED TO EXPLAIN THIS IDEA.
THIS IS SAMPLE IMAGE USED TO EXPLAIN THIS IDEA.

IMAGE PROCESSING APPARATUS, IMAGE PROCESSING METHOD AND MEDIUM

BACKGROUND OF THE INVENTION

1. Field of the Invention

The present invention relates to an image processing apparatus and method, which apply predetermined image processing to an optically scanned document image.

2. Description of the Related Art

Conventionally, a form recognition technique for recognizing an image of a form (to be also referred to as a query form hereinafter) input via a scanner or the like, and automatically classifying the query form to similar forms is popularly used. In such form recognition technique, image data of the query form scanned by, for example, a scanner is divided into a plurality of areas having attributes, and feature amounts are extracted from the respective areas. The plurality of areas may often have different attributes. Furthermore, form format data of the query form is generated based on the extracted feature amounts. Similarities between the form format data of the query form and those of registered forms which are registered in advance are calculated, and a registered form with the highest similarity is determined as the form recognition result. In the method of calculating the similarities of form format data, various techniques have been developed.

Japanese Patent Laid-Open No. 2000-285187 discloses a form recognition apparatus which executes form recognition based on form format data obtained by adding an interest level of a table block obtained by image feature amount extraction means to the form format data. As described in this reference, the similarity output as the form recognition result can assume a value approximate to sensuous impressions.

Japanese Patent Laid-Open No. 2001-109842 discloses an optical character scanning apparatus which exploits an identification color area on a form in form identification. As described in this reference, since the identification color area on a form is used in form identification in place of a form ID using letters insignificant for a user, easy-to-see forms separated by colors are provided to the user, and scanning processing can be executes simultaneously.

Furthermore, Japanese Patent Laid-Open No. 2000-285190 discloses a form identification apparatus which identifies a form by narrowing down a search range by classifying, in advance, registered forms having a plurality of features such as recognition results of color information, ruled line information, and the like using common features. As described in this reference, a large number and many types of forms having a plurality of features can be identified.

However, stamps such as "urgent", "approved", and the like may be put on or seals may be attached to forms as paper media in terms of management. When such forms are scanned by a scanner or the like, a part where a stamp or seal is put is selected to undergo area division, and form format data including an unwanted element is generated. A technique for dividing an image into areas is an elemental technology, which is popularly used not only in form identification processing, but also in general image processing such as character recognition processing, tilt correction processing, and the like. Therefore, unwanted elements such as a stamp, seal, and the like are desirably removed before various kinds of image processing are executed. However, the aforementioned references do not particularly describe such issues.

SUMMARY OF THE INVENTION

The present invention provides an image processing apparatus which generates processing data in which unwanted elements are removed prior to image processing, and can execute the image processing using the processing data.

The present invention in its first aspect provides an image processing apparatus comprising:

an extraction unit configured to extract areas having predetermined attributes from image data of a document;

a calculation unit configured to calculate skew angles of the areas extracted by the extraction unit;

a selection unit configured to select necessary elements by determining, as unnecessary elements, the areas having the calculated skew angles not less than a threshold and by determining, as the necessary element, the areas having the calculated skew angles less than the threshold; and a processing unit configured to apply image processing to the necessary elements selected by the selection unit.

The present invention in its second aspect provides an image processing method comprising:

an extraction step of extracting areas having predetermined attributes from image data of a document;

a calculation step of calculating skew angles of the areas extracted in the extraction step;

a selection step of selecting necessary elements by determining, as unnecessary elements, the areas having the calculated skew angles not less than a threshold and by determining, as the necessary element, the areas having the calculated skew angles less than the threshold; and a processing step of applying image processing to the necessary elements selected in the selection step.

The present invention in its third aspect provides a computer-readable medium storing an image processing program for making a computer function to:

extract areas having predetermined attributes from image data of a document;

calculate skew angles of the extracted areas;

select necessary elements by determining, as unnecessary elements, the areas having the calculated skew angles not less than a threshold and by determining, as the necessary element, the areas having the calculated skew angles less than the threshold; and apply image processing to the selected necessary elements.

According to the present invention, processing data in which unwanted elements are removed is generated prior to image processing, and the image processing can be executed using the processing data.

Further features of the present invention will become apparent from the following description of exemplary embodiments with reference to the attached drawings.

DESCRIPTION OF THE EMBODIMENTS

The best mode for carrying out the present invention will be described in detail hereinafter with reference to the drawings. Note that the same reference numerals denote the same components, and a repetitive description thereof will be avoided.

Figure 1:
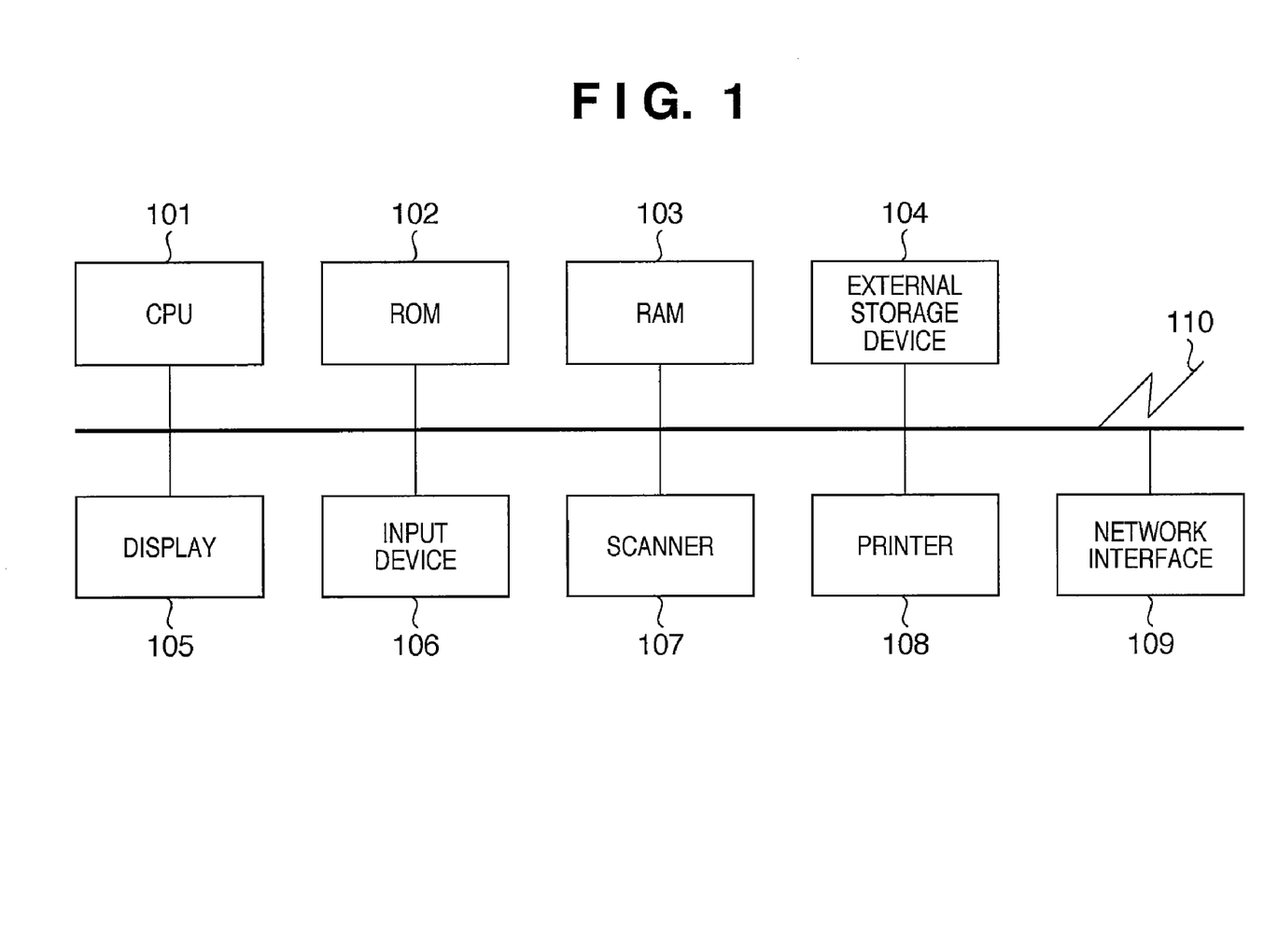
FIG. 1 is a schematic block diagram showing the arrangement of an image processing apparatus according to an embodiment of the present invention.

FIG. 1 is a schematic block diagram showing the arrangement of an image processing apparatus according to an embodiment of the present invention. As shown in FIG. 1, this image processing apparatus includes a CPU 101, ROM 102, RAM 103, external storage device 104, and display 105. Also, this image processing apparatus includes an input device 106, scanner 107, printer 108, and network interface 109. The CPU 101 controls the overall image processing apparatus in accordance with a control program stored in the ROM 102. The ROM 102 may also store various parameter data in addition to the control program. The RAM 103 stores image data and the like, and is also used as a work area and temporary saving area of data. The external storage device 104 comprises, for example, a hard disk, CD-ROM, and the like, and stores various data including a database used to manage image data. For example, the external storage device 104 may store, for example, a database having patterns of characters used in character recognition processing. The display 105 comprises, for example, an LCD, CRT, or the like, and the input device 106 comprises, for example, a mouse, pen tablet, and the like.

The scanner 107 is, for example, a scanner which can input a color image. The scanner 107 optically scans an image of a form or the like, and can acquire it as image data. The printer 108 prints image data that has undergone predetermined image processing.

When the image processing apparatus shown in FIG. 1 is implemented by a general-purpose computer, for example, the control program may be stored in the external storage device 104, and may be loaded onto the RAM 103 in accordance with an operator's instruction when it is executed. This image processing apparatus can communicate with an external network via the network interface 109. For example, a server, external storage device, and the like are connected to the external network, and this image processing apparatus can read out or write programs, data, and the like from or in these devices via the network interface 109. As the network, a communication network such as a LAN, WAN, or the like may be used. Such communication network includes the Internet, telephone line, dedicated digital line, ATM, frame relay line, communication satellite line, cable television line, data broadcasting wireless line, and the like. The display 105 and scanner 107 shown in FIG. 1 may be connected via the network interface 109. In this embodiment, the aforementioned functional blocks are interconnected via a bus 110 such as a system bus and the like.

Figure 2:
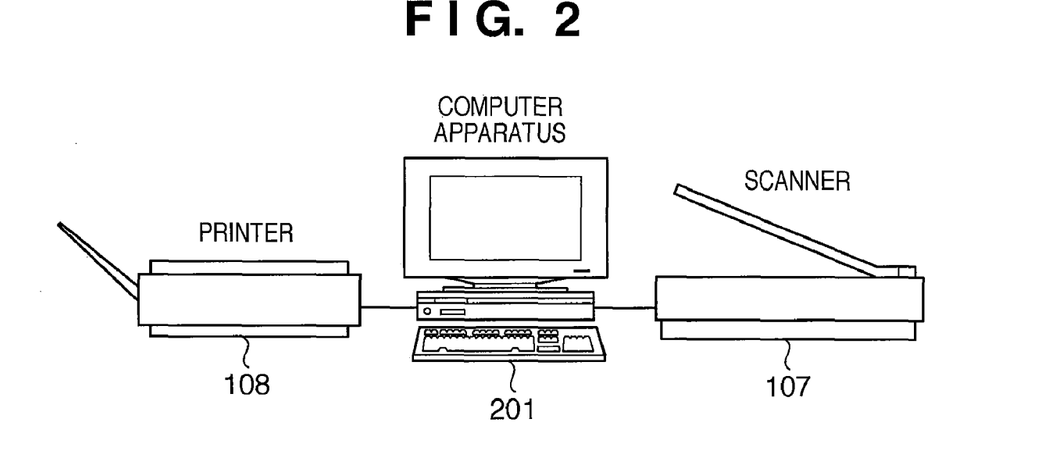
FIG. 2 is a view showing one implementation example configured by functional blocks shown in FIG. 1.

FIG. 2 shows one implementation example configured by the functional blocks shown in FIG. 1. As shown in FIG. 2, the image processing apparatus comprises a computer apparatus 201, the scanner 107, and the printer 108. The computer apparatus 201 shown in FIG. 2 includes the CPU 101, ROM 102, RAM 103, external storage device 104, display 105, input device 106, and network interface 109, and executes predetermined image processing. A document image optically scanned by the scanner 107 is converted into digital image data, which is output to the computer apparatus 201. The printer 108 prints image data which has undergone the predetermined image processing and the like. Note that the image processing includes form identification processing, image generation processing, character recognition processing, and the like. The image processing to be executed by this image processing apparatus will be described later. The display 105 and printer 108 shown in FIG. 1 are examples of output devices, and other output devices may be connected.

Figure 3:
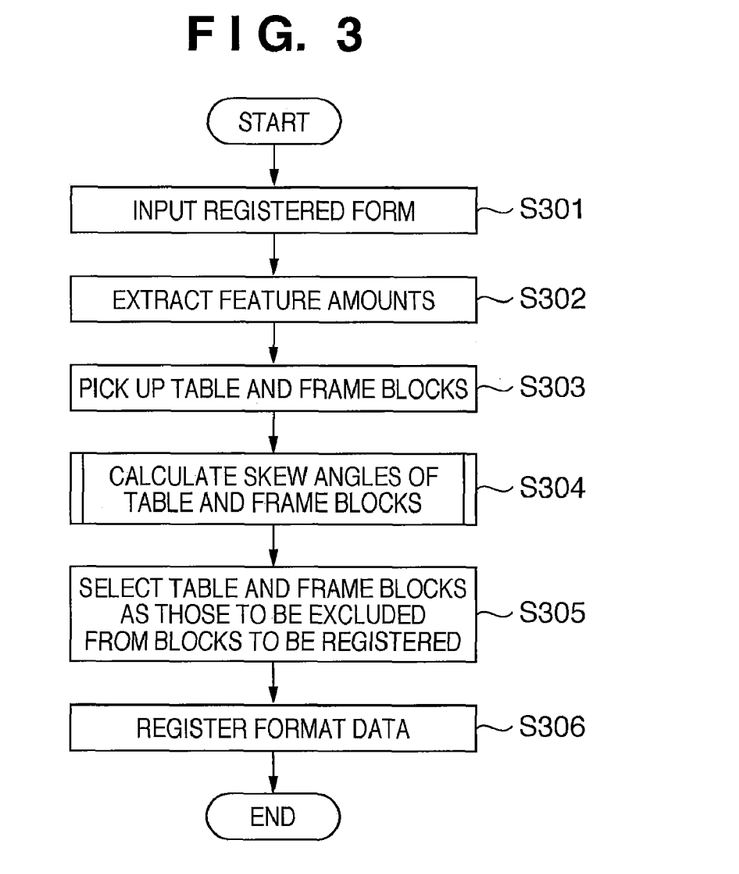
FIG. 3 is a flowchart showing the sequence of form registration processing in the image processing apparatus according to the first embodiment of the present invention.

The operation of the image processing apparatus according to the first embodiment of the present invention will be described below. FIG. 3 is a flowchart showing the sequence of form registration processing in the image processing apparatus according to the first embodiment of the present invention. Note that a form indicates an image configured by laying out a plurality of areas each of which is bounded by a plurality of ruled lines.

Figure 4:
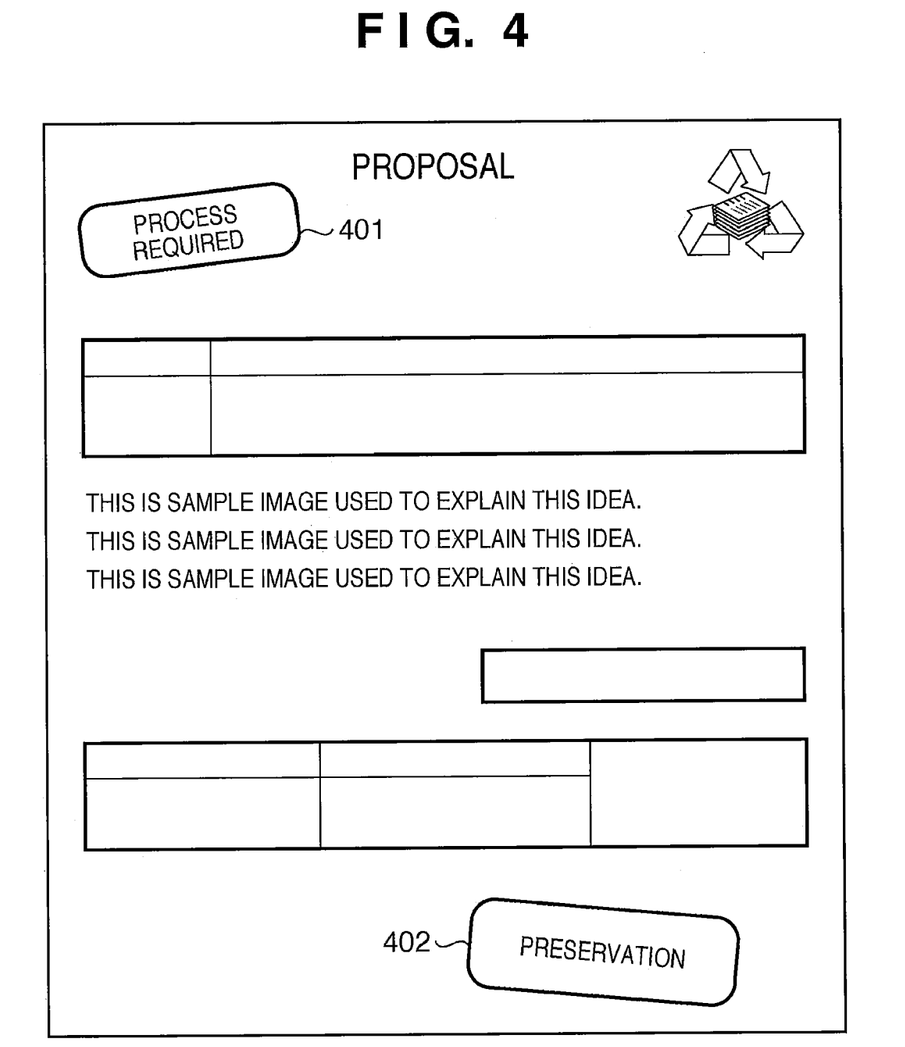
FIG. 4 is a view showing an example of an image input in step S301 shown in FIG. 3.
Figure 5:
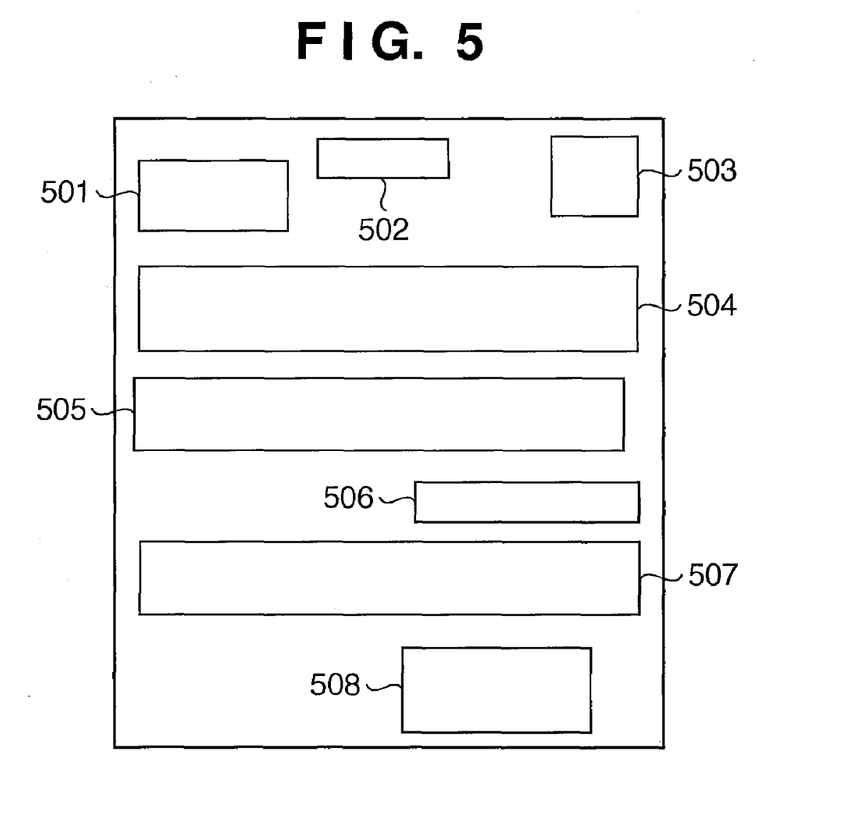
FIG. 5 is a view showing a state in which features of shapes of the form image shown in FIG. 4 are extracted in step S302 shown in FIG. 3.

In step S301, the scanner 107 inputs an image. FIG. 4 shows an example of the input image. In this embodiment, a form image shown in FIG. 4 is input using the scanner 107. The scanner 107 applies binarization processing to the input form image. In step S302, feature amounts associated with shapes in the input form image are extracted. Note that the feature amounts associated with the shapes indicate information of the sizes, the positions, the number, the number of cells, and the like of images such as tables, frames, text, and the like included in the form image. FIG. 5 shows a state in which the features associated with the shapes of respective images included in the form image shown in FIG. 4 are extracted in step S302. As shown in FIG. 5, the images shown in FIG. 4 are extracted as feature amounts such as text blocks 502, 505 as character strings, frame blocks 501, 506, 508 which are bounded by outer frames and include no ruled lines, table blocks 504, 507 which ate bounded by outer frames and include ruled lines, and an image block 503 of a photo image or the like. In this embodiment, each block indicates a rectangular area which circumscribes text or that surrounded by a circumscribed rectangle which circumscribes a set of black pixels. A case will be explained below wherein at least one rectangular area is extracted from the image data of a document, as shown in FIG. 5. In this embodiment, an area which is extracted to have a shape other than the circumscribed rectangle is excluded from objects to be processed. For example, when a label area 401 shown in FIG. 4 overlaps a table below the area 401, that is, a table block 504 shown in FIG. 5, since it is not extracted as a circumscribed rectangular area, that area is excluded from objects to be processed according to this embodiment.

Figure 6:
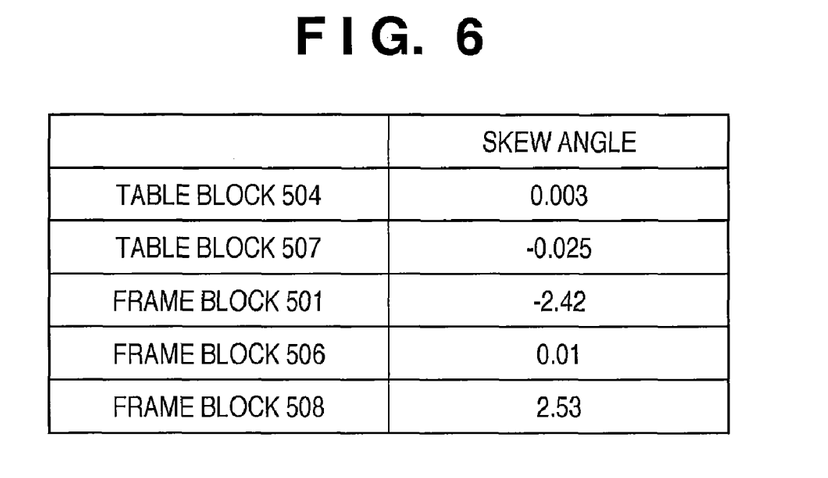
FIG. 6 is a table showing skew information of selected table and frame blocks.

A text block is a rectangular area having a text attribute, and a frame block is a rectangular area having a frame attribute. A table block is a rectangular area having a table attribute, and an image block is a rectangular area having an image attribute. In this embodiment, the image processing apparatus has a means for extracting such rectangular areas as one of extraction means (unit). In step S303, table blocks and frame blocks are selected from a plurality of blocks extracted in step S302. For example, in FIG. 5, table blocks 504 and 507 and frame blocks 501, 506, and 508 are selected. In step S304, the tilts (skew angles) of the table and frame blocks selected in step S303 are calculated. The image processing apparatus of this embodiment has such function as one of calculation means (unit). For example, an angle may be calculated based on a line that defines one side of the rectangular frame that defines the table or frame block, and a reference axis such as an X- or Y-axis serving as a reference for determining coordinates on an image. The calculated tilt is stored in, for example, the RAM 103 or the like as skew information of each block. FIG. 6 shows skew information of the selected table and frame blocks. A skew column shown in FIG. 6 represents angles. When each table or frame block tilts clockwise, its angle is represented by a positive value, or when it tilts counterclockwise, its angle is represented by a negative value. In step S305, blocks having the tilts equal to or larger than a predetermined threshold are extracted with reference to the absolute values of the skew information of the table and frame blocks selected in step S303. For example, when the predetermined threshold is 1°, blocks having the skew angles equal to or smaller than −1° and equal to or larger than +1° are extracted, and these blocks are determined as unwanted elements on the document. On the other hand, blocks having the skew angles smaller than the predetermined threshold (less than the threshold) are determined as wanted elements. For example, in FIG. 6, frame blocks 501 and 508 are extracted, and are determined as unwanted elements. In this embodiment, the predetermined threshold may be designated by the user via a user interface, or may be calculated by a dynamic method, for example, a method of calculating an average value of the skew information of other blocks. The image data in which unwanted elements and wanted elements are determined in step S305 is defined as processing data (processing data associated with rectangular areas determined as unwanted and wanted elements is generated). This image processing apparatus has the aforementioned means as one of generation means (unit). In this embodiment, an unwanted element will also be referred to as an unnecessary element, and a wanted element will also be referred to as a necessary element.

The image processing apparatus of this embodiment applies, to an externally input document, processing for determining elements having tilts such as a stamp, seal, and the like as unwanted elements. Furthermore, processing for analyzing the structure of the image or removing deterioration factors of the image may be applied to the image data in which unnecessary and necessary elements are determined, that is, processing data.

In step S306, the feature amounts of remaining blocks after unwanted blocks in the processing data are removed are registered in the external storage device 104. That is, blocks other than unwanted blocks are selected as objects to be processed of the feature amount extraction processing, and the feature amounts extracted from the selected blocks are registered in the external storage device. For example, in FIG. 5, the feature amounts of the remaining blocks except for the frame blocks 501 and 508 are registered in the external storage device 104 as format data of the externally input document. The format data in which unwanted elements are removed and which is registered in the external storage device 104 can be used as format data of a registered form in form identification processing as one of processing means (unit) of this embodiment.

Figure 7:
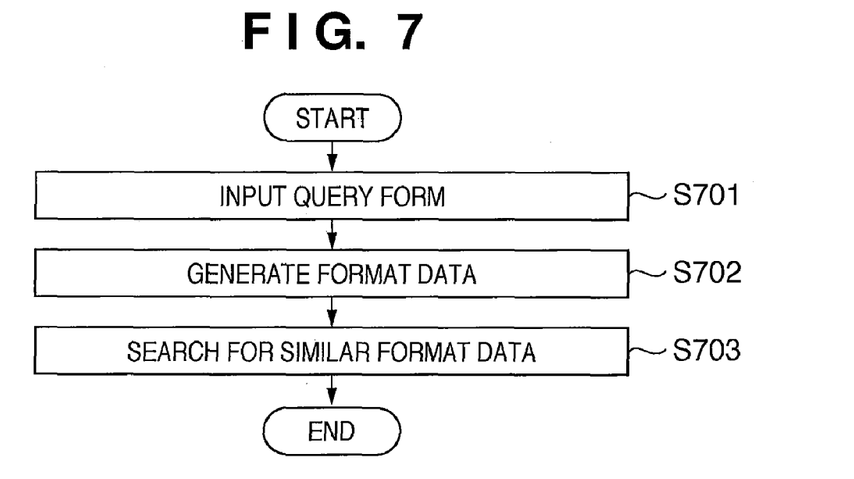
FIG. 7 is a flowchart showing the sequence of form identification processing in the image processing apparatus according to the first embodiment of the present invention.

FIG. 7 is a flowchart showing the sequence of form identification processing in the image processing apparatus according to the first embodiment of the present invention. The processing data, in which unnecessary and necessary elements are determined, described using FIG. 3, can be used not only as a registered form but also as a query form in the form identification processing.

In step S701, a form image is input from the scanner 107. In this flowchart, the input form image will be particularly referred to as a query image. In step S702, image data of the query form scanned by the scanner 107 undergoes binarization processing, and the obtained binary data undergoes the processes in steps S302 to S306 shown in FIG. 3 to generate processing data and format data. In step S703, form identification processing for executing matching with format data of registered forms as reference data in comparison, which are registered in advance in the external storage device 104 or the like, extracting format data of a registered form with the highest similarity, and identifying the query form as the registered form is executed. Note that the form identification processing is one of processing means (unit) executed by the image processing apparatus in this embodiment.

In this embodiment, when the image processing apparatus executes the form identification processing, blocks having angles equal to or larger than the threshold, that is, label areas 401 and 402 shown in FIG. 4, are detected from elements obtained by area division. The detected label areas 401 and 402 can be excluded from the image data of the registered form or query form as unwanted elements. Therefore, even an image appended with a stamp, seal, and the like can undergo the form identification processing without being influenced by them. In step S303, the table and frame blocks are selected from the plurality of blocks extracted in step S302. Alternatively, blocks having other attributes such as an image block and the like may be selected.

The operation of the image processing apparatus according to the second embodiment of the present invention will be described below.

Figure 8:
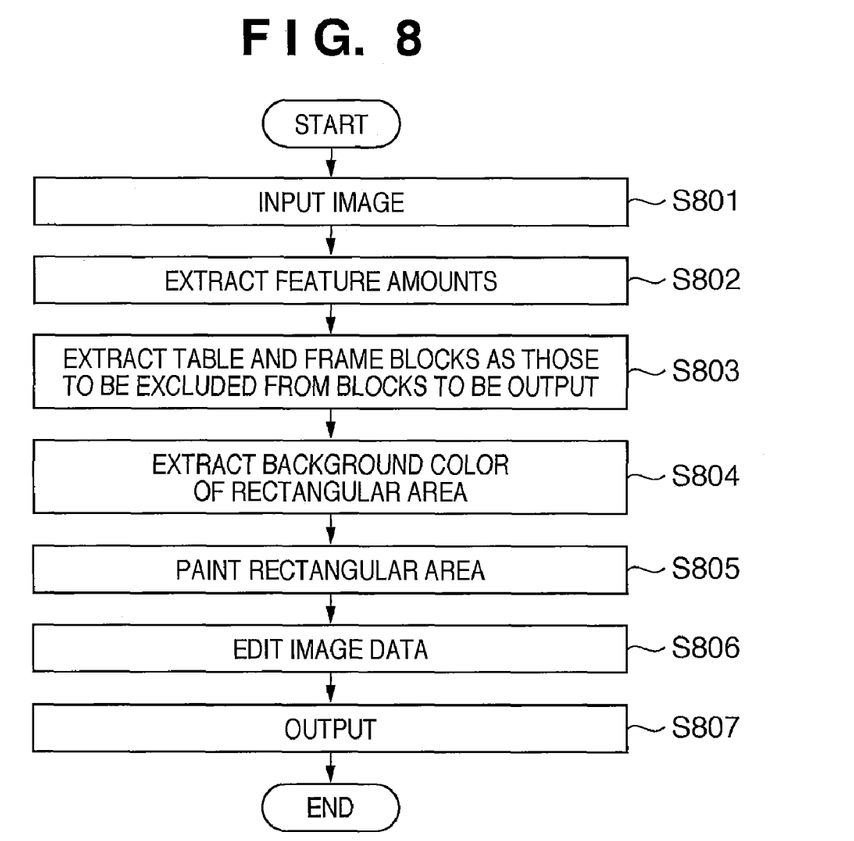
FIG. 8 is a flowchart showing the sequence of image generation processing in an image processing apparatus according to the second embodiment of the present invention.
Figure 9:
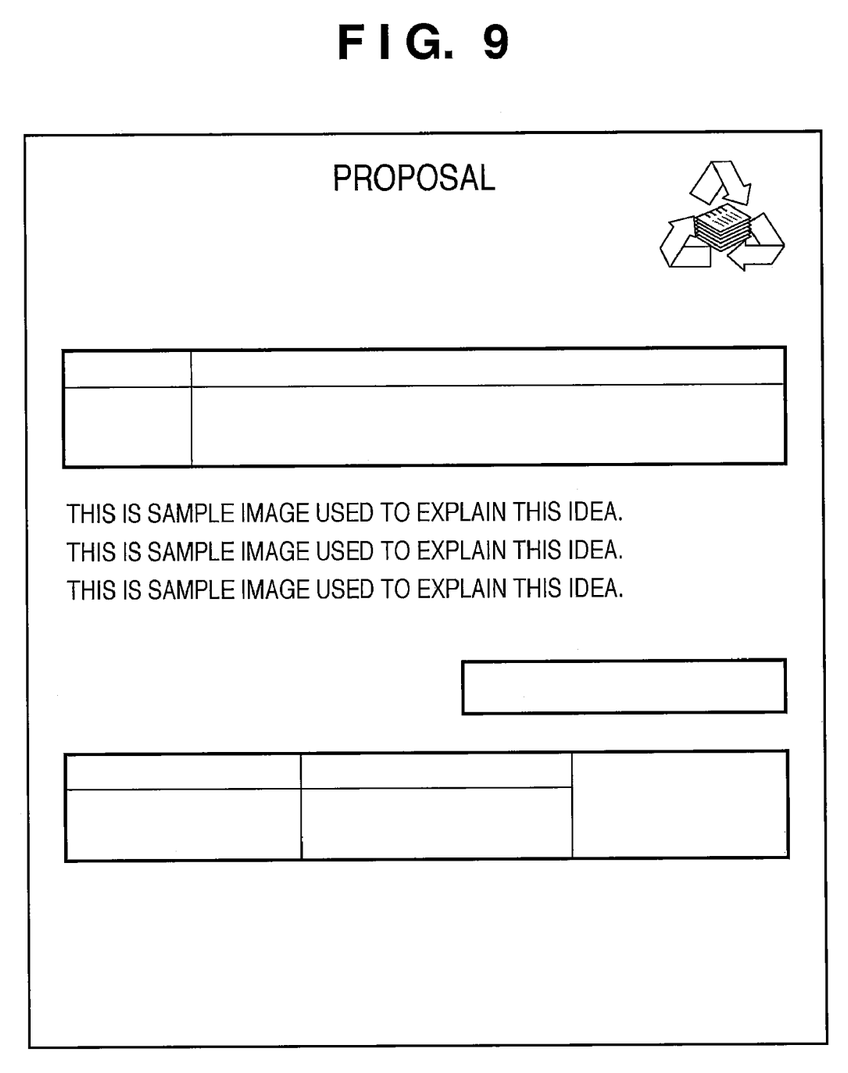
FIG. 9 is a view showing an image generated in step S806 shown in FIG. 8.

FIG. 8 is a flowchart showing the sequence of image generation processing in the image processing apparatus according to the second embodiment of the present invention. In step S801, a form image, as shown in FIG. 4, is input from the scanner 107. In this case, the form image scanned by the scanner 107 is temporarily stored in the RAM 103. In this embodiment, the stored form image will be particularly referred to as an original image hereinafter. The original image stored in the RAM 103 undergoes binarization processing, and the process advances to step S802. In step S802, the feature amounts associated with shapes of images included in the original image are extracted. Note that the feature amounts are the same as those described in the first embodiment. In step S803, the processes in steps S303 to S305 shown in FIG. 3 are executed to generate processing data in which table and frame blocks to be excluded from those which are to undergo image generation processing are selected. In step S804, the original image stored in the RAM 103 is read out, and a background color of unwanted blocks is extracted with reference to the processing data. For example, in this embodiment, pixel values one pixel outside a rectangular area of each block are referred to, and a pixel value with the highest frequency of occurrence is adopted as a background color by a majority method. In step S805, each block extracted in step S803 is painted by the extracted background color. Therefore, each block having the skew information equal to or larger than the threshold in the original image is painted by the background color of that block. FIG. 9 shows an image generated in step S806. As shown in FIG. 9, in step S806 the label areas 401 and 402 indicated by "process required" and "preservation" are deleted from the original image shown in FIG. 4. In step S807, the generated image is output from an output device such as the display 105, printer 108, or the like.

In this embodiment, when the image processing apparatus executes the image generation processing, blocks having the angles equal to or larger than the threshold, that is, the label areas 401 and 402 shown in FIG. 4, of elements obtained by area division, are painted by the background color. Therefore, even an image appended with a stamp, seal, and the like can undergo the image generation processing without being influenced by them. Note that the image generation processing is executed as one of processing means (unit) to be executed by the image processing apparatus in this embodiment.

The operation of the image processing apparatus according to the third embodiment of the present invention will be described below. In this embodiment, the image processing apparatus executes character recognition processing. In general, the character recognition processing includes binarization processing for converting an image scanned by a scanner, facsimile apparatus, or the like into binary data, extraction processing for extracting characters one by one, and recognition processing for searching a database or the like for a character similar to each extracted character. In this embodiment, when the scanner 107 inputs a form image, and converts it into binary image data, processing data in which blocks having angles equal to or larger than a threshold are detected is generated by processing steps S302 to S305 shown in FIG. 3. The generated processing data may be stored in, for example, the external storage device 104. The subsequent extraction processing and recognition processing are executed for the processing data stored in the external storage device 104.

Therefore, in this embodiment, before the image processing apparatus executes the character recognition processing, the processing data, in which blocks having the angles equal to or larger than the threshold, that is, the label areas 401 and 402 shown in FIG. 4, of elements obtained by area division, are detected, is generated. Upon execution of the character recognition processing, areas except for unwanted elements (label areas 401 and 402) undergo the character recognition processing with reference to the processing data. Therefore, even an image appended with a stamp, seal, and the like can undergo the character recognition processing without being influenced by them. Note that the character recognition processing is executed as an example of processing means (unit) to be executed by the image processing apparatus in this embodiment. The character recognition result of areas other than the label areas can be used as a part of format data (feature amounts) in the first embodiment.

Note that the label areas 401 and 402 may undergo the character recognition processing by correcting their angles with reference to the processing data, so as to obtain the character recognition results in the label areas. The character data in these label areas are excluded from objects to be processed since they are not suited to use as format data upon form identification. However, even in such case, these character data may be used as meta data upon searching for a registered form image using keywords.

The operation of the image processing apparatus according to the fourth embodiment of the present invention will be described below. In this embodiment, the image processing apparatus executes tilt correction processing. When a document skews upon scanning an image using a scanner or the like, the scanned image data has a tilt. Such tilt causes a considerable drop of precision upon execution of the processing described in the first to third embodiments. Therefore, processing for detecting the tilted image and correcting it to an erected image is required. In general, in such tilt correction processing, when an image is scanned by a scanner or the like, a skew angle with respect to a reference axis such as an X-axis, Y-axis, or the like is detected, and the tilt is corrected by rotating the image in accordance with the detected skew angle. However, when the scanned image includes stamp and seal images, the skew angle of a document cannot often be normally detected due to the influence of these images. Hence, in this embodiment, when a skewed form image is input by the scanner 107, the processes in steps S302 to S304 shown in FIG. 3 are executed. Furthermore, the skew angles of respective blocks are calculated, and processing data including data of the skew angles of the detected blocks is generated. The generated processing data may be stored in, for example, the external storage device 104. The subsequent tilt correction processing is applied to the processing data stored in the external storage device 104. Since an image is scanned to have a skew, many blocks in the image have tilts. Hence, in this embodiment, the skew angle of a document itself due to its skewing is determined based on the distribution of the skew angles of the blocks. Then, blocks having the skew angles largely different from this skew angle are determined as those of the stamp, seal, and the like. For example, when the distribution of skew angles includes a plurality of nearly the same skew angle values, these skew angles are determined as those caused by skewing, and blocks having the skew angles largely different from these skew angles are determined as those of the stamp and seal. That is, a specific value is determined based on the skew angles of a plurality of blocks in the image, and it is determined that the tilts of the blocks having skew angles distributed around the specific value are caused by skewing. Furthermore, blocks having the skew angles largely different from the specific value by a threshold or more are determined as those of the stamp, seal, and the like. After that, the skew angle of the document is finally determined based on the blocks other than those determined as the stamp and seal, and the document image undergoes tilt correction based on the determined skew angle.

In this embodiment, before the image processing apparatus executes the tilt correction processing, blocks having angles equal to or larger than a threshold (i.e., blocks corresponding to the label areas 401 and 402 shown in FIG. 4) of elements obtained by area division are detected, and the skew angle of a document is determined based on blocks other than the detected blocks. Therefore, even an image appended with a stamp, seal, or the like can undergo precise tilt correction processing without being influenced by them. After the tilt correction processing, areas except for unwanted elements may undergo character recognition processing. As for unwanted elements (areas of a stamp and seal), character recognition processing may be applied to each area after that area undergoes the tilt correction processing. Note that the tilt correction processing is executed as an example of processing means (unit) to be executed by the image processing apparatus in this embodiment.

The operation of the image processing apparatus according to the fifth embodiment of the present invention will be described below. In this embodiment, the image processing apparatus executes document orientation correction processing based on the direction of characters in the document. For example, upon scanning an image by a scanner or the like, when a document is set to have an orientation opposite to the designated orientation, character recognition processing cannot be applied. In such case, as is well-known, the direction of characters is recognized, and characters are corrected in a normal direction. Therefore, in this embodiment, when a form image is input by the scanner 107, the processes in steps S302 to S305 shown in FIG. 3 are executed to generate processing data in which blocks having angles equal to or larger than a threshold are detected. The generated processing data may be stored in, for example, the external storage device 104. The subsequent orientation correction processing is applied to the processing data stored in the external storage device 104.

Therefore, in this embodiment, before the image processing apparatus executes the orientation correction processing, the processing data, in which blocks having the angles equal to or larger than the threshold, that is, the label areas 401 and 402 shown in FIG. 4, of elements obtained by area division, are detected, is generated. Upon execution of the orientation correction processing, the direction of characters is detected based on areas except for the unwanted elements (label areas 401 and 402) with reference to the processing data, and the orientation of the document is determined based on the detection result, thus executing the document orientation correction processing. Therefore, even an image appended with a stamp, seal, and the like can undergo the orientation correction processing without being influenced by them. Note that the orientation correction processing is executed as an example of processing means (unit) executed by the image processing apparatus in this embodiment.

The present invention can take embodiments in the forms of a system, apparatus, method, program, storage medium, and the like. More specifically, the present invention can be applied to either a system constituted by a plurality of devices, or an apparatus consisting of a single piece of equipment. Note that a program of software that implements the functions of the aforementioned embodiments (a program corresponding to the flowcharts shown in the drawings of the embodiments) may be directly or remotely supplied to a system or apparatus. In this case, the present invention includes a case in which it is achieved when the system or apparatus reads out and executes the supplied program code. The program code itself installed in a computer to implement the functional processing of the present invention using the computer implements the present invention. That is, the present invention includes the computer program itself for implementing the functional processing of the present invention. In this case, the form of program is not particularly limited, and an object code, a program to be executed by an interpreter, script data to be supplied to an OS, and the like may be used as long as they have the program function. As a recording medium for supplying the program, for example, a floppy Disk®, hard disk, optical disk, and magneto-optical disk may be used. In addition, MO, CD-ROM, CD-R, CD-RW, magnetic tape, non-volatile memory card, ROM, DVD (DVD-ROM, DVD-R), and the like may be used.

The program may also be supplied in such a manner that the user establishes a connection to a homepage on the Internet and downloads a file including the computer program itself of the present invention from the homepage to a recording medium such as a hard disk or the like. In this case, that file may be compressed and may include an automatic installation function. Also, program codes that form the program of the present invention may be segmented into a plurality of files, which may be downloaded from different homepages. Therefore, the present invention includes a WWW server which makes a plurality of users download a program file required to implement the functional processing of the present invention by their computers.

Also, a storage medium such as a CD-ROM or the like, which stores the encrypted program (image processing program) of the present invention, may be delivered to users. In this case, each user who has cleared a predetermined condition can download key information required for decryption from a homepage via the Internet, and can execute the encrypted program using that key information to install the program on a computer, thus implementing the functions of the present invention. The functions of the aforementioned embodiments can be implemented not only by executing the readout program code by the computer but also by some or all of actual processing operations executed by an OS or the like running on the computer based on an instruction of that program. Furthermore, the program read out from the recording medium may be written in a memory equipped on a function expansion board or function expansion unit which is inserted into or connected to the computer. In this case, a CPU or the like equipped on the function expansion board or unit executes some or all of actual processing operations based on an instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-215246, filed Aug. 21, 2007 which is hereby incorporated by reference herein in its entirety.

What is claimed is:

1. An image processing method comprising:
   an extraction step of extracting areas having predetermined attributes from image data of a document;
   a calculation step of calculating skew angles of the areas extracted in the extraction step;
   a determination step of determining, as a necessary element, an area of the areas having a skew angle less than a threshold, and determining, as an unnecessary element, an area of the areas having a skew angle equal to or more than the threshold;
   a selection step of selecting an area determined as a necessary element among the areas; and
   a processing step of storing the area selected in said selection step in a memory as format data of a registered form,
   wherein the format data of the registered form is used for a form identification processing, and in the form identification processing, the registered form having format data most similar to format data of a query form is identified by comparing the format data of the query form with the format data of the registered form stored in the memory.

2. An image processing apparatus comprising:
   an extraction unit configured to extract areas having predetermined attributes from image data of a document;
   a calculation unit configured to calculate skew angles of the areas extracted by said extraction unit;
   a determination unit configured to determine, as a necessary element, an area of the areas having a skew angle less than a threshold, and determine, as an unnecessary element, an area of the areas having a skew angle equal to or more than the threshold;
   a selection unit configured to select an area determined as a necessary element among the areas; and
   a processing unit configured to use the area selected by said selection unit as format data of a query form,
   wherein the processing unit executes a form identification processing to identify a registered form having format data most similar to the format data of the query form by comparing the format data of the query form with the format data of the registered form which are stored in a memory.

3. An image processing apparatus comprising:
   an extraction unit configured to extract areas having predetermined attributes from image data of a document;
   a calculation unit configured to calculate skew angles of the areas extracted by said extraction unit;
   a determination unit configured to determine, as a necessary element, an area of the areas having a skew angle less than a threshold, and determine, as an unnecessary element, an area of the areas having a skew angle equal to or more than the threshold;
a selection unit configured to select an area determined as a necessary element among the areas; and
a processing unit configured to store the area selected by said selection unit in a memory as format data of a registered form,
wherein the format data of the registered form is used for a form identification processing, and in the form identification processing, the registered form having format data most similar to format data of a query form is identified by comparing the format data of the query form with the format data of the registered form stored in the memory.

4. The apparatus according to claim 3, wherein said processing unit further executes image generation processing for generating an image by painting the unnecessary element in the document with a background color around the unnecessary elements.

5. The apparatus according to claim 3, wherein said processing unit further executes character recognition processing for the necessary elements selected by said selection unit.

6. A non-transitory computer-readable medium storing an image processing program for making a computer function to:
extract areas having predetermined attributes from image data of a document;
calculate skew angles of the extracted areas;
determine, as a necessary element, an area of the areas having a skew angle less than a threshold;
determine, as an unnecessary element, an area of the areas having a skew angle equal to or more than the threshold;
select an area determined as a necessary element among the areas; and
store the area selected in a memory as format data of a registered form,
wherein the format data of the registered form is used for a form identification processing, and in the form identification processing, the registered form having format data most similar to format data of a query form is identified by comparing the format data of the query form with the format data of the registered form stored in the memory.

7. An image processing method comprising:
an extraction step of extracting areas having predetermined attributes from image data of a document;
a calculation step of calculating skew angles of the areas extracted in said extraction step;
a determination step of determining, as a necessary element, an area of the areas having a skew angle less than a threshold, and determining, as an unnecessary element, an area of the areas having a skew angle equal to or more than the threshold;
a selection step of selecting an area determined as a necessary element among the areas; and
a processing step of using the area selected in said selection step as format data of a query form,
wherein the processing step includes executing a form identification processing to identify a registered form having format data most similar to the format data of the query form by comparing the format data of the query form with the format data of the registered form which are stored in a memory.

8. A non-transitory computer-readable medium storing an image processing program for making a computer function to:
extract areas having predetermined attributes from image data of a document;
calculate skew angles of the extracted areas;
determine, as a necessary element, an area of the areas having a skew angle less than a threshold;
determine, as an unnecessary element, an area of the areas having a skew angle equal to or more than the threshold;
select an area determined as a necessary element among the areas; and
use the selected area as format data of a query form,
wherein using the selected area includes executing a form identification processing to identify a registered form having format data most similar to the format data of the query form by comparing the format data of the query form with the format data of the registered form which are stored in a memory.

* * * * *